(12) United States Patent
Hashimoto et al.

(10) Patent No.: US 6,284,940 B1
(45) Date of Patent: Sep. 4, 2001

(54) METHOD FOR DECOMPOSING HALOGENATED ORGANIC COMPOUND

(75) Inventors: Masanori Hashimoto; Katsuaki Suzuki, both of Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 09/586,779

(22) Filed: Jun. 5, 2000

(30) Foreign Application Priority Data

| Jun. 7, 1999 | (JP) | 11-159816 |
| Oct. 15, 1999 | (JP) | 11-294065 |
| Dec. 21, 1999 | (JP) | 11-363021 |

(51) Int. Cl.⁷ .................................................. A62D 3/00
(52) U.S. Cl. ............................................ 588/207; 588/209
(58) Field of Search ................................. 588/207, 209

(56) References Cited

U.S. PATENT DOCUMENTS

| 4,632,742 | * | 12/1986 | Tundo | 204/158.21 |
| 4,925,999 | * | 5/1990 | Yonezawa | 585/469 |
| 5,075,017 | * | 12/1991 | Hossain et al. | 210/761 |
| 5,304,702 | * | 4/1994 | Weiss et al. | 588/206 |
| 5,968,467 | * | 10/1999 | Karasek | 423/240 |
| 6,162,958 | * | 12/2000 | Tateishi et al. | 588/207 |
| 6,197,199 | * | 3/2001 | McArdle | 210/684 |

FOREIGN PATENT DOCUMENTS

4-241880  8/1992  (JP) .

OTHER PUBLICATIONS

Hashimoto, M., CA134:32623, 2000.*
Organohalogen Compounds, vol. 27 (1996), pp. 147–153, Full–Scale Plant Study on Low Temperature Themal Dechlorination of PCDDs/PCDFs in Fly Ash, Michio Ishida et al.

* cited by examiner

*Primary Examiner*—Deborah C. Lambkin
(74) *Attorney, Agent, or Firm*—Kanesaka & Takeuchi

(57) ABSTRACT

By reaction of halogenated organic compounds with at least one amino acid compound selected from a group consisting of amino acid, polyamino acid, amino acid salts and polyamino acid salts under heating, halogenated organic compounds such as dioxins contained in soil can be easily and effectively decomposed. By adding and mixing the amino acid compound to the halogenated organic compounds, followed by adding and mixing of a water-absorbing agent thereto and subsequent heating, an effective decomposition treatment can be carried out with excellent operation properties, preventing lumping and deposition of the treated material. A method for decomposing halogenated organic compounds in which the amino acid compound is added and mixed with solid material such as soil contaminated with halogenated organic compounds, followed by adding and mixing of a water-absorbing agent and subsequent heating of resultant mixture to decompose halogenated organic compounds. They are mixed in a mixer which contains mixing media in a drum rotating around a horizontal axis while simultaneously vibrating, an uniform mixing is achieved by mutual collision of the solid material and the mixing media, enabling an effective decomposition treatment.

22 Claims, 2 Drawing Sheets

METHOD FOR DECOMPOSING HALOGENATED ORGANIC COMPOUND

BACKGROUND OF THE INVENTION AND RELATED ART STATEMENT

The present invention relates to a method for decomposing a halogenated organic compound, and more particularly, to a method for decomposing a halogenated organic compound contained in soil such as polychlorodibenzo-p-dioxins (PCDD), polychlorodibenzofurans (PCDF), and coplanar polychlorobiphenyl (PCB) (These materials are hereinafter generally referred to as "dioxins".) with good operation property and high efficiency.

In incineration plants such as those for municipal waste, dioxins precursors (precursors for the dioxins) including organic compounds such as phenols, benzene and acetylene, chlorinated aromatic compounds such as chlorophenols and chlorobenzenes, and chlorinated alkyl compounds are formed during incineration. When flyash coexists with the dioxins precursors, the precursors change to the dioxins under the catalytic action of the flyash, and the generated dioxins exist in incineration ash. Also, the generated dioxins sometimes contaminate the incineration plant and ambient soil therearound.

Conventional technologies for decomposing dioxins in soil include a method using supercritical state water, a method using ozone or ultraviolet rays, a method by heating, a method utilizing special fungi such as "Maitake" or "Enokidake" or wood-rotting bacteria, and a method using a catalyst.

Conventional methods for decomposing dioxins contained in flyash are as follows;

(1) To keep dioxins-containing flyash for 1–2 hours at a temperature between 320 and 400° C. under a reductive atmosphere such as nitrogen (for instance, 2 hours at 320° C. or 1–1.5 hours at 340° C.) (Hagenmaier process, "ORGANOHALOGEN COMPOUNDS Vol. 27 (1996)" p.147–152);

(2) Heating dioxins-containing flyash at 300–500 ° C. under the existence of a dioxins formation inhibitor (JPA 4-241880).

However, all of the above-mentioned methods for decomposing dioxins contained in soil have problems in decomposition efficiency or treating operation. Especially, the method using ultraviolet rays offers a low decomposition efficiency as the rays are effective only at the irradiated surface. Also, the method using catalysts has difficulties in treating operation. The method by heating has problems of recombination and evaporation of dioxins, and the method using bacteria has low decomposition efficiency.

The methods described in the above items (1) and (2) for decomposing dioxins contained in flyash have a drawback that their high treatment temperature and long treatment time require much energy and high cost. Especially, in the above mentioned method (1), it is required to carry out the treatment under a reductive atmosphere such as nitrogen gas, bringing about complexity and a high cost.

OBJECT AND SUMMARY OF THE INVENTION

A first object of the present invention is to provide a method for decomposing a halogenated organic compound which can effectively decompose the dioxins in soil.

A first aspect of the method for decomposing a halogenated organic compound is for achieving the first object. According to the method, halogenated organic compound reacts under heating with one or more amino acid compounds selected from a group of amino acids, polyamino acids, amino acid salts, and polyamino acid salts.

In the first aspect method, dehalogenation occurs by the reaction of the amino acid compound with halogens such as chlorine in dioxins, thus achieving the decomposition of dioxins.

As the amino acid compound does not vaporize under a reaction temperature effective for decomposition of dioxins, it can be added and mixed of in liquid or solution form, with object to be treated such as soil, and can be easily heated and brought into reaction.

A second object of the present invention is to provide a method for decomposing a halogenated organic compound, in which soil or other media containing halogenated organic compounds are treated with amino acids, salts thereof, polyamino acids, or salts thereof to effect the decomposition of the halogenated organic compounds while preventing the lumping and deposition of treated materials, thus enabling an effective decomposition of halogenated organic compounds with favorable operation properties.

A second aspect of the method for decomposing a halogenated organic compound is for achieving the second object.

According to the method, one or more amino acid compounds selected from a group consisting of amino acids, polyamino acids, and amino acid salts are added to and mixed with materials containing halogenated organic compounds, followed by addition and mixing of a water-absorbing agent and subsequent heating of the resultant mixture.

While the material such as soil easily forms lump or deposit, the water-absorbing agent added and mixed prior to the heating step absorbs water, so that the material assumes a fine granule form with non-sticking and free flowing nature.

Thus, lumping and deposition of the material are prevented, whereby the material is mixed and, handled easily with giving a high heating efficiency and a high decomposition efficiency of the halogenated organic compounds.

The method according to the second aspect is especially effective for the treatment of soil contaminated with dioxins which is particularly easy to form lump and deposit. As the water-absorbing agent, quicklime (calcium oxide) is particularly suitable.

A third object of the present invention is to improve a process for decomposing a halogenated organic compound in which at least one of the amino acid compounds is added to and mixed with solid material, such as soil contaminated with halogenated organic compounds, and if desired followed by adding and mixing of a water-absorbing agent, and subsequent heating of the resultant mixture to decompose the halogenated organic compounds. The third object is to provide a method which enables an effective mixing of the decomposing agent with solid material, and an effective mixing of the water-absorbing agent with the mixture of solid material and the decomposing agent, thus providing a decrease of water content during the mixing of the decomposing agent, an improvement of handling properties of the mixture, and a decrease of requirements for decomposing agent or water-absorbing agent by an improvement of addition effect thereof, thus in overall enabling an effective decomposition of halogenated organic compounds.

Third and fourth aspects of the method for decomposing a halogenated organic compound are for achieving the third object.

The method of the third aspect comprises a mixing step in which the amino acid compound is added to and mixed with solid material contaminated with halogenated organic compounds, and a heating step in which the mixture from the mixing step is subjected to a heating treatment to decompose halogenated organic compounds. The mixing step uses a mixing apparatus comprising a mixing media such as plurality of cylindrical rods contained in a drum which vibrates while rotating around a horizontal axis, achieving a homogeneous mixing as a result of mutual collision between the solid material and the rods induced by the vibration.

The method of the fourth aspect comprises a first mixing step in which the amino acid compound is added to and mixed with solid material contaminated with halogenated organic compounds, a second mixing step in which a water-absorbing agent is added to and mixed with the mixture from said first mixing step, and a heating step in which the mixture from said second mixing step is subjected to a heating treatment to decompose halogenated organic compounds. The first mixing step uses a mixing apparatus comprising a mixing media such as plurality of cylindrical rods contained in a drum which vibrates while rotating around a horizontal axis, achieving a homogeneous mixing as a result of mutual collision between the solid material and the rods induced by the vibration.

When the amino acid compound is added to the solid material to be treated such as soil and mixed according to the method of the third and fourth aspects, the solid material and the amino acid compound are mixed, or rather kneaded, as a result of the actions of mutual collision, shear and friction occurring between the mixing media such as rods and material being mixed, between the inner surface of the mixing apparatus and material being mixed, between the mixing media themselves, and between the mixing media and the inner surface of the mixing drum, respectively, bringing about a thorough and homogeneous mixing without generating deposit on the drum inner surface or media, without occurring of an under-mixed part, or without forming a sticky, dumpling-like mass.

When the water-absorbing agent is added to and mixed with thus obtained mixture of solid material and amino acid compound, a similar effect of mixing, or rather kneading, is obtained as a result of the actions of mutual collision, shear and friction occurring between the mixing media such as rods and material being mixed, between the inner surface of the mixing apparatus and material being mixed, between the mixing media themselves, and between the mixing media and the inner surface of the mixing drum, respectively, bringing about a thorough and homogeneous mixing without generating deposit on the drum inner surface or media, without occurring of an under-mixed part, or without forming a sticky, dumpling-like mass. As a result of homogeneous mixing of the water-absorbing agent, an easy-to-handle fine granular mixture can be obtained with a small addition amount of the water-absorbimg agent.

The resultant mixture has an excellent handling properties in transfer and other operations, and a good thermal conductivity in subsequent heating process, enabling an effective heat decomposition of halogenated organic compounds.

BRIEF DESCRIPTION THE DRAWINGS

DESCRIPTION OF THE PREFERRED EMBODIMENTS

Figure 1:
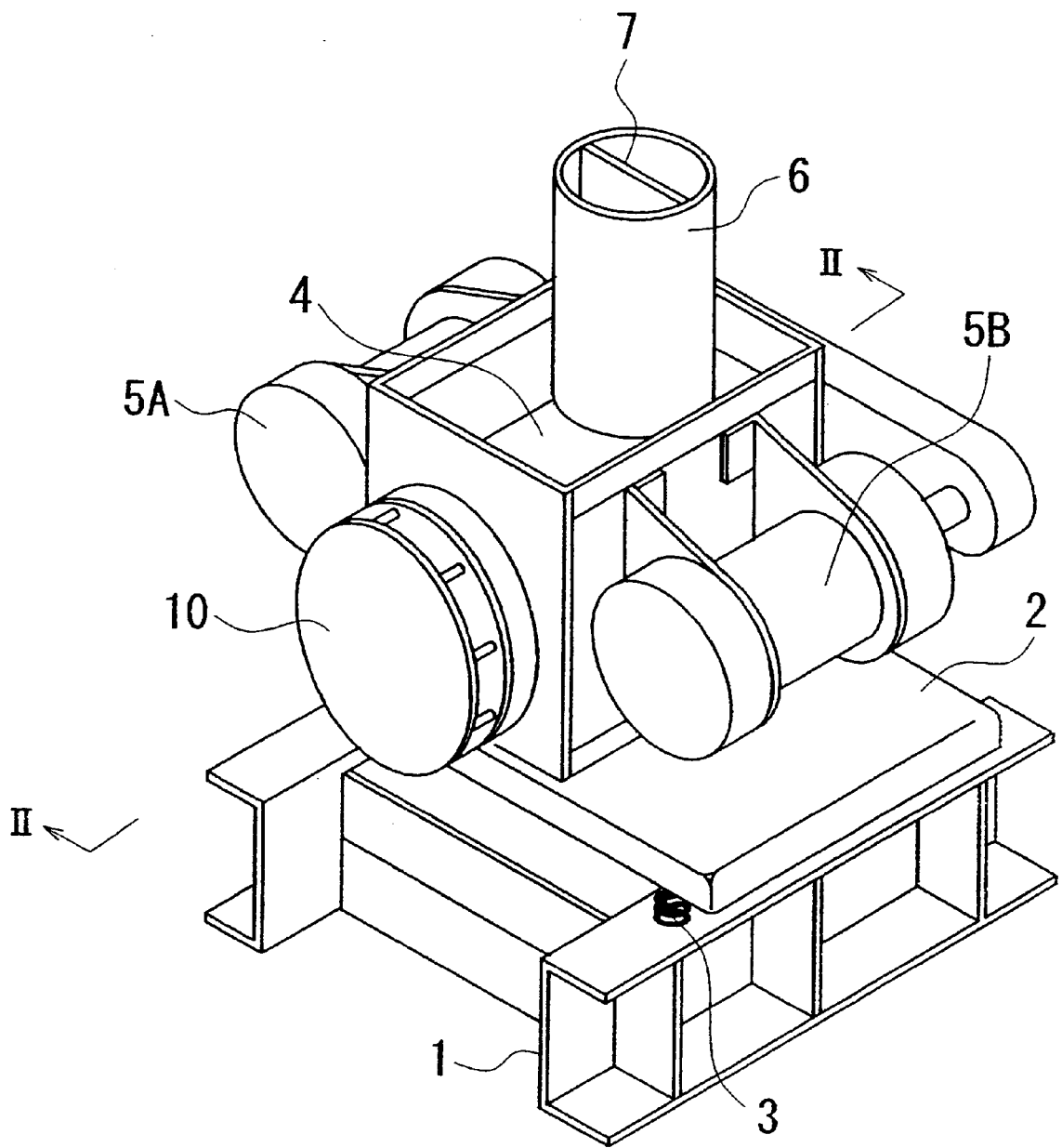
FIG. 1 is a perspective view showing an embodiment of the mixing apparatus favorably used in the method for decomposing halogenated organic compounds according to the present invention.

Hereinafter, the embodiments of the present invention will be described in more detail.

At first, the first aspect will be described in detail.

The amino acids suitable for use in the first aspect include glutamic acid, glutamine, glutathione, glycilglycine, alanine, aminobutyric acid, aminocapronic acid, arginine, asparagic acid, asparagine, citruline, tryptophan, threonine, glycine, cystine, cysteine, histidine, hidroxyproline, isoleucine, leucine, lysine, methionine, ornithine, phenylalanine, phenylglycine, proline, serine, tyrosine, and valine. As the polyamino acids, polymers of the above-mentioned amino acids can be used without special limitation to their molecular weights. The amino acid salts include sodium salts, potassium salts, calcium salts, and magnesium salts of above-mentioned amino acids and polyamino acids. Especially the calcium salts give a high decomposition ratio.

Each of the amino acids, amino acid salts, polyamino acid, and polyamino acid salts can be used alone or in combination of two or more compounds.

An additive amount of the amino acid compound described above is preferably 0.1 to 10% by weight against air dried weight of the object to be treated such as soil, from the viewpoint of the treatment cost and the decomposition efficiency of dioxins.

The amino acid compound is preferably added in the form of solution in water, although they can be added in solution of any solvents other than water, or they can optionally be added in powder form. When added in powder form, it can assume solution form after they are added to the material to be treated such as soil.

The higher the reaction temperature, the higher the decomposition rate and, consequently, the decomposition ratio, but generally 200–400° C., especially 250–350° C. is preferable. A reaction temperature lower than 200° C. gives low reaction speed and low decomposition ratio. A reaction temperature higher than 400° C. gives rise to high treatment cost because of increased thermal energy, and also to disadvantages such as vaporization of halogenated organic compounds such as dioxins.

The reaction time varies depending on the reaction temperature, the form of the object to be treated, the dioxins concentration, or other conditions, but typically, it can be appropriately set at a range of 10–180 minutes.

The method of the first aspect can be carried out by adding and mixing at least one of the amino acid compounds with the object to be treated containing halogenated organic compounds, such as soil containing dioxins, and heating the resultant mixture at a predetermined temperature for a predetermined time. Any kind of mixing apparatus or heating apparatus for this process can be employed. A certain mixing is preferable to be carried during heating reaction in order to equalize the temperature in the system, but this is not always necessary.

Upon adding the amino acid compound(s) to the object to be treated, it is preferable to supply a certain amount of water for the purpose of the uniform dispersion of the amino acid compound in the object to be treated. It is convenient, as described above, to add the amino acid compound in the form of aqueous solution, which can be mixed uniformly with the object to be treated.

Heating can be carried out with using a kiln including a rotary kiln. For instance, the above described mixture is introduced at one end of a rotary kiln in which temperature is set gradually higher from one end to the other end, so that the mixture introduced at one end is first dried, then brought into reaction while passing a region at the reaction temperature or higher, and discharged after the halogenated organic compounds are sufficiently decomposed.

The treated material discharged from the kiln can be disposed of in land reclamation or other ends. In case the exhaust gas emitted from the kiln is feared to contain volatile materials from soil or decomposition products of amino acid compounds, it can be emitted after the volatile material is burned off in oil burner or electric furnace. Otherwise, it can be washed with water.

The method according to the first aspect can be easily carried out with a very simple equipment, as the process consists of only adding and mixing amino acid compounds with the object to be treated such as soil, followed by heating.

Hereinafter, the first aspect will be described in more detail, with reference to examples and comparative examples relating to the first aspect.

COMPARATIVE EXAMPLES 1–3

Dioxin decomposition test was made on a sample of air-dried dioxin-contaminated soil having particle size under 2 mm. The determination result of dioxin concentration of this sample was as shown in Table 1.

20.0 g of this sample was taken in a porcelain crucible. The taken samples were treated in an electric furnace set at temperatures shown in Table 1 for 60 minutes and were let to cool. After cooling, the treated samples ware subjected to a determination of dioxins concentration, from which results the decomposition ratios were obtained which are shown in Table 1. The method for determining the dioxins concentration and method for calculating the toxicity equivalent shown in Table 1 conform to a method described in"The Tentative Manual for Soil Survey Related to Dioxins" (Water Quality Bureau, Environment Agency, Government of Japan). The decomposition ratio indicates a percentage of the decreased dioxins concentration or toxicity equivalent, respectively, against the original dioxins concentration or the original toxicity equivalent.

EXAMPLES 1–7

Water solution of the amino acid compound shown in Table 1 was added and mixed with 20 g of samples, respectively. Each of the additive amounts of the amino acid compound is shown in Table 1. After mixing, samples were treated similarly to Comparative Example 1, that is, treated in an electric furnace set at temperatures shown in Table 1 for 60 minutes and were let to ocool. After cooling, the treated samples were subjected to a determination of dioxins concentration, from which results the decomposition ratios were obtained which are shown in Table 1.

As is evident from Table 1, the higher the heating temperature, the higher the decomposition ratio of dioxins. Amino acid compounds do not gasify at high temperatures, which property enabling the use of such a high reaction temperatures, to achieve a high decomposition ratios.

TABLE 1

| | Amino acid compounds | | Heating temperature °C. | Dioxins concentration (ng/g-soil) | Decomposition ratio (%) | Toxicity equivalent (ng-TEQ/g-soil) | Toxicity decomposition ratio (%) |
| --- | --- | --- | --- | --- | --- | --- | --- |
| | Kind | Addition (Weight %/soil) | | | | | |
| Sample | — | | — | 750 | — | 10 | — |
| C1* | no addition | | 250 | 240 | 68.0 | 6.7 | 33.0 |
| C2 | no addition | | 300 | 98 | 86.9 | 2.6 | 74.0 |
| C3 | no addition | | 350 | 62 | 91.7 | 1.7 | 83.0 |
| E1* | glycine | 3.0 | 300 | 57 | 92.4 | 0.99 | 90.1 |
| E2 | glycine Na salt | 3.0 | 250 | 31 | 95.9 | 0.51 | 94.9 |
| E3 | glycine Na salt | 3.0 | 300 | 35 | 95.3 | 0.58 | 94,2 |
| E4 | β-alanine | 3.0 | 300 | 54 | 92.8 | 0.80 | 92.0 |
| E5 | lysine | 3.0 | 300 | 9.3 | 98.8 | 0.20 | 98.0 |
| E6 | lysine | 4.0 | 300 | 0.50 | 99.9 | 0.012 | 99.9 |
| E7 | Polyasparagic acid Na salt (M. weight 2000) | 3.0 | 300 | 67 | 91.1 | 1.2 | 88.0 |

*C1–C2 indicate comparative examples 1–3. E1–E7 indicate examples 1–7.

As described in detail in the above, according to the first aspect of the method for decomposing halogenated organic compounds, halogenated organic compounds contained in soil or other media can be decomposed easily and effectively without using complicated process or equipment, bringing the residual concentration to an extremely low level.

Hereinafter, the second aspect will be described in detail.

The amino acids suitable for use in the second aspect include glutamic acid, glutamine, glutathione, glycilglycine, alanine, aminobutyric acid, aminocaproic acid, arginine, asparagic acid, asparagine, citruline, tryptophan, threonine, glycine, cystine, cysteine, histidine, hydroxyproline, isoleucine, leucine, lysine, methionine, ornithine, phenylalanine, phenylglycine, proline, serine, tyrosine, and valine. As the polyamino acids, polymers of the above-mentioned amino acids can be used without special limitation to its molecular weight. As the amino acid salts, sodium salts, potassium salts, calcium salts, and magnesium salsas of above-mentioned amino acids and polyamino acids can be used. Especially, calcium salts give a high decomposition ratio.

These amino acid compounds can be used alone or in combination of two or more compounds, and the addition of which is preferably 0.1 to 10% by weight against air dried weight of the object to be treated such as soil, from the viewpoint of treatment cost and decomposition efficiency of dioxins.

Upon addition and mixing of the amino acid compounds to the object to be treated, a certain amount of water is preferably supplied in order to enhance the uniform dispersion of the amino acid compound. Accordingly, the amino acid compound is preferably added in the form of solution in water, although they can be added in solution of any solvents other than water, or it can optionally be added in powder form. When added in powder form, it can assume solution form after they are added to the object to be treated such as soil.

At the addition and mixing of the amino acid compound, an excessive supply of water makes the treated material slurry-like, increasing the water-absorbing agent requirement. The concentration of the aqueous solution of the amino acid compound is preferable to be controlled in such a manner that the total water content of the object to be treated such as soil after addition of the solution comprises 2–30 parts by weight against 100 parts by weight of the air dried soil.

After the addition and mixing of the amino acid compound with the object to be treated such as soil, a water absorbing agent is added and mixed.

As the water-absorbing agent, quicklime, water-absorbing resin, zeolite or other water-absorbing minerals, and silica gel can be used. Quicklime is especially preferable as it has an effect to produce finer granule, and also it gives higher decomposition ratio.

Any kind of water absorbing-resin, and starch-based or acrylic acid-based products in the market can be used. As to product form of the resin, a fine powder form is preferred to the powder form from the viewpoint of absorption efficiency.

The additive amount of the water-absorbing agent is determined depending to the nature of the object to be treated, for instance, its lumping or sticking tendencies, or amount of water supplied at the addition of the amino acid compound. For quicklime, 1–50 weight %, especially 3–20 weight % against air dried weight of the object to be treated such as soil is preferable. For water-absorbing resin, 0.1–5 weight %, especially 0.2–3 weight % against air dried weight of the object to be treated such as soil is preferable. For silica gel or water-absorbing clay minerals such as zeolite, 1–50 weight %, especially 3–20 weight % against air dried weight of the object to be treated such as soil is preferable. In addition, when water-absorbing resin is used as water-absorbing agent, mixing operation should be carried out carefully, because an excessive kneading can cause lumping just as in the case in which water-absorbing agent is not used.

Thus, addition of water-absorbing agent after addition and mixing of the amino acid compound prevents lumping and sticking, and considerably improves the handling property of the object to be treated as a result of water absorption of the object by the water-absorbing agent.

After addition and mixing of the water-absorbing agent, the mixture is heated. The higher the heating temperature, the higher the decomposition rate and, as a result, decomposition ratio, but generally 200–400° C., especially 250–350° C. is preferable. A reaction temperature lower than 200° C. gives low reaction rate and low decomposition ratio. A reaction temperature higher than 400° C. gives rise to high treatment cost because of increased thermal energy, and also to disadvantages such as vaporization of halogenated organic compounds such as dioxins.

The reaction time varies depending to the reaction temperature, the form of the object to be treated, the dioxins concentration, or other conditions, but typically, it can be conveniently set at a range of 10–180 minutes.

The method of the second aspect can be carried out by adding and mixing the amino acid compound(s) with the object to be treated containing halogenated organic compounds, such as soil containing dioxins, and then adding and mixing water-absorbing agent, and heating the resultant mixture at a predetermined temperature for a predetermined time. Any kind of mixing apparatus or heating apparatus can be employed. A certain mixing is preferable to be carried during heating reaction in order to equalize the temperature in the system, but this is not always necessary.

Heating can be carried out using, a kiln including a rotary kiln. For instance, the above described mixture is introduced at one end of a rotary kiln, and discharged from the other end. During this process, the mixture subjected to the heat treatment keeps a smooth flowing state ensuring a smooth treatment without depositing inside the rotary kiln.

The method according to the second aspect can be easily carried out with very simple equipment, as the process consists of only adding and mixing amino compounds and water-absorbing agent, successively, with the object to be treated such as soil, followed by heating.

Hereinafter, the second aspect will be described in more detail, with reference to examples and comparative examples.

EXAMPLE 8

Dioxin decomposition test was made on a sample of dioxin-contaminated soil (particle size under 5.0 mm). Dioxins concentration of this sample was 32,000 pg-TEQ/g as toxicity equivalent.

4 parts by weight of lysine was added as water solution to 100 parts of soil and mixed with it. The water content at this step consisted of 16 parts by weight in original soil plus 20 parts by weight from water solution of lysine. The soil mixed with lysine solution formed lumps (dumpling-like) as large as a fist, and was fed to a rotary kiln. The soil deposited inside the kiln to form a cake.

The targeted treatment conditions of the rotary kiln were as follows. The dioxins concentration (toxicity equivalent) of the obtained treated product was as shown in Table 2.

Soil feed rate: 20 kg-DS/hr

Heating temperature: 300° C.

Residence time at 300° C.:60 min.

EXAMPLE 9

Same treatment as in Example 8 was carried out except that quicklime was added to the soil and mixed in ratios shown in Table 2. States of the mixtures were observed and the results are shown in Table 2.

It was obserbed that addition of more than 8 parts by weight of quicklime gave a fine granuled mixture with good flowing property. The soil where quicklime of 8 parts by weight was added was fed to a rotary kiln. The treatment condition in the rotary kiln was as follows.

Soil feed rate: 20 kg-DS/hr

Heating temperature: 300° C.

Residence time at 300° C.: 60 min.

The mixture was fed to the kiln smoothly and flowing state of the mixture inside the kiln was good, whereby it was treated smoothly. The dioxins concentration (toxicity equivalent) in the exhaust gas was 37 pg-TEQ/Nm$^3$, and the dioxins concentrations (toxicity equivalent) and decomposition ratios of the treated products were as shown in Table 2, showing a higher decomposition ratio than in the above Example 8.

EXAMPLE 10

Same treatment as in Example 8 was carried out except that a fine powder, starch-based water absorbing resin was added to and mixed with soil in ratios shown in Table 2. States of the mixtures were observed and the results are shown in Table 2. It was obserbed that addition of 0.5 weight part of the water absorbing resin gave a fine granuled mixture with good flowing property.

The mixture of the addition of 0.5 parts by weight of water-absorbing resin was fed to a rotary kiln, and treated with the same condition as in Example 9.

As a result, the mixture was fed to the kiln smoothly and flowed in a good condition in the kiln. The dioxins concentrations (toxicity equivalent) and decomposition ratios in the obtained treated products were as shown in Table 2, showing a satisfactory decomposition level.

TABLE 2

| Example | Lysine addition (parts) | Absorbing material Kind | Addition (parts) | State of mixture | Toxicity equivalent* (pg-TEQ/g) |
|---|---|---|---|---|---|
| Example 8 | 4.0 | — | 0 | lump | 4,600 (85.6%) |
| Example 9 | 4.0 | quicklime | 2.0 | granule | — |
| | | | 6.0 | small granule | — |
| | | | 8.0 | fine granule | 80 (99.8%) |
| | | | 10 | fine granule | — |
| | | | 20 | fine granule | — |
| | | | 30 | fine granule | — |
| Example 10 | 4.0 | absorbing resin | 0.1 | granule | — |
| | | | 0.3 | small granule | — |
| | | | 0.5 | fine granule | 120 (98.8%) |
| | | | 0.7 | fine granule | — |
| | | | 0.9 | fine granule | — |

*A numeral value in parentheses indicates a decomposition ratio.

Example 9 using the quickline showed higher decomposition ratio than Example 10 using the water-absorbing resin. This is probably because the lysine formed calcium salts which has a high reactivity.

As described above, in the treatment in which materials containing halogenated organic compounds such as soil is treated with at least one of amino acids, salts thereof, polyamino acids and salts thereof to decompose halogenated organic compounds, according to the second aspect, lumping or deposition of the object to be treated can be prevented and operation properties can be improved, while achieving an effective decomposition of halogenated organic compounds.

Hereinafter, the third and fourth aspects will be described in detail.

At first, a construction of a mixer suitable for use in the aspects will be explained with reference to FIGS. 1–3.

Figure 2:
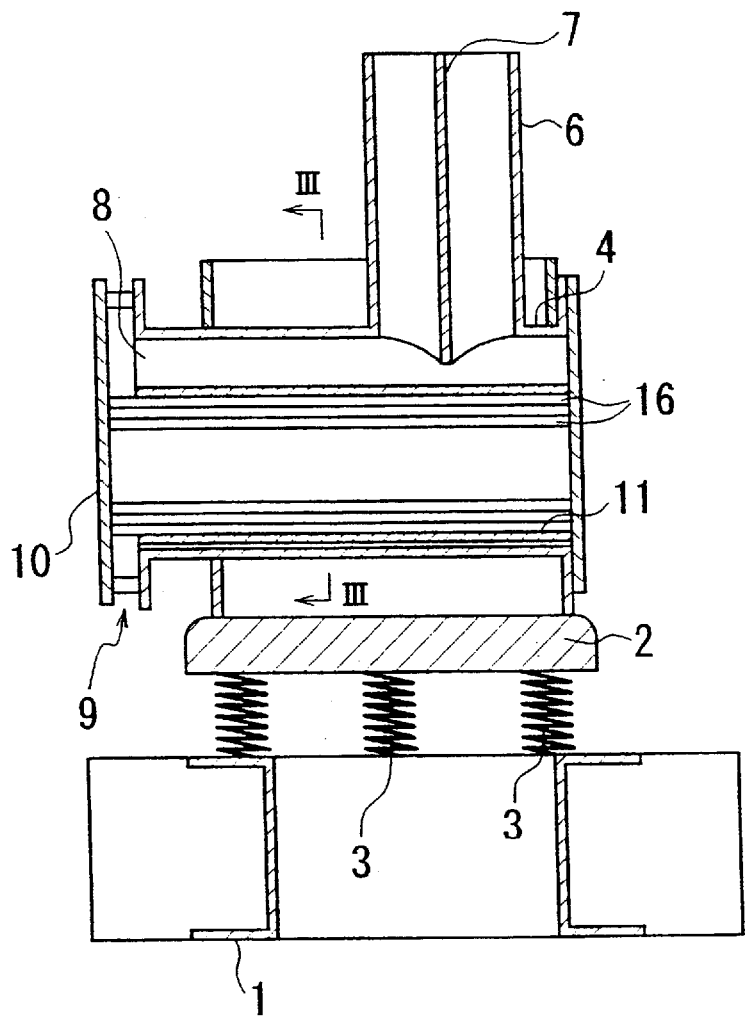
FIG. 2 is a cross sectional view taken along the line II—II in FIG. 1.
Figure 3:
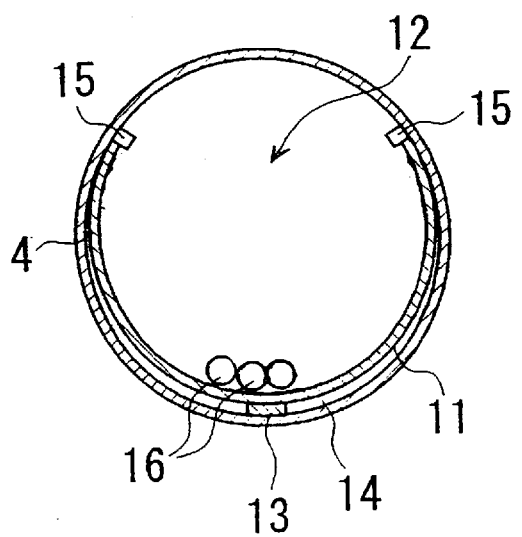
FIG. 3 is a cross sectional view taken along the line III—III in FIG. 2.

FIGS. 1–3 are illustrations showing an embodiment of a mixer (rod-containing, outer rotating and vibrating agitation mixer) of which FIG. 1 is a perspective view, FIG. 2 is a cross sectional view taken along line II—II in FIG. 1, and FIG. 3 is a cross sectional view taken along line III—III in FIG. 2.

A mixer has a cylindrical drum 4 which is fixed on a base plate 2 arranged over a base 1 and is supported elastically by plurality of springs 3 provided between the base 1 and the base plate 2. At both sides of the drum 4, a pair of rotating weight vibrators 5A, 5B are attached which are driven synchronously by a belt drive.

A feeding tube 6 for material to be mixed is connected to the upper periphery of one end of the drum 4. The inside of the feed tube 6 is divided by a partition 7 so that two kinds of materials to be mixed can be fed separately. At the other end of the drum 4 is provided an outlet 8 in front of which is fixed an end plate 10, with a space 9 between outlet 8 and end plate 10 for downward exit of the mixed material.

Inside the drum 4 is arranged a kneading tube 11 having an axial opening 12 at the upper periphery. The kneading tube 11 is arranged eccentrically relative to the axis of the drum 4 with its lower periphery supported by a block 13 provided at the inner lower periphery of the drum 4, leaving a predetermined space 14 between the kneading tube and the inner periphery of the drum 4. Both ends of the aforementioned opening 12 are engaged with protrusions 14 provided at the inner upper periphery of the drum 4, which engagement preventing the upward movement of the kneading tube 11. The kneading tube 11 holds in its inside a number of cylindrical rods 16.

The mixer applies a vibration to the drum 4 by means of the vibrators 5A, 5B while being fed with material to be mixed by way of feeding tube 6, thus achieving a kneading effect.

In the mixer shown in FIG. 1, a centrifugal force generated by synchronous operation of two rotating weight vibrators 5A, 5B causes a rotating vibration of the drum 4. The drum 4 holds tens of cylindrical rods 16 in its inside, which violently rotate and jump due to the rotating vibration of the drum 4. When material to be mixed is fed into the drum 4, material is kneaded by the actions of impact, shear, and friction between material and the cylindrical rods 16, between material and the kneading tube 11, between the cylindrical rods 16 themselves, and between the cylindrical rods 16 and the kneading tube 11. Material being mixed, even in case of wet material, hardly deposits onto the inner surface of the kneading tube 11 as the kneading tube 11 is violently vibrating due to the colliding action of cylindrical rod 16 and material. Accidental deposit is immediately removed by the vibration of the kneading tube 11, ensuring an effective and stable kneading of wet material. The kneading tube 11 and the rods 16 are preferably lined with rubber in order to control noise generation.

Obtained mixture flows from the outlet 8 to the space 9 and falls out of the mixer. The kneading tube 11 provided inside the drum 4 is not always necessary and can be omitted.

The methods of the third and fourth aspects comprise a mixing step in which solid material to be treated contaminated with halogenated organic compounds and the amino acid compound and, if desired, the water absorbing agent are mixed is carried out with using the mixer shown in the illustration, to effect a uniform mixing by the above described action of impact, shear, and friction.

The solid material to be treated, the amino acid compound and the water-absorbing agent can be effectively mixed to yield an easy-to-handle mixture.

Hereinafter, the amino acid compound and the water-absorbing agent which are to be mixed in the third and fourth aspects, and the heating step after the mixing step will be explained.

The amino acid compound suitable for use includes amino acids, salts thereof, polyamino acids and salts thereof The amino acids include glutamic acid, glutamine, glutathione, glycilglycine, alanine, aminobutyric acid, aminocapronic acid, arginine, asparagic acid, asparagine, citruline, tryptophan, threonine, glycine, cystine, cysteine, histidine, hydroxyproline, isoleucine, leucine, lysine, methionine, ormithine, phenylalanine, phenylglycine, proline, serine, tyrosine, and valine. As the polyamino acids, polymers of the above-mentioned amino acids can be used without special limitation to its molecular weight. As the amino acid salts, such salts as sodium salts, potassium salts, calcium salts, and magnesium salsas of above mentioned amino acids and polyamino acids can be used. Especially, calcium salts give a high decomposition ratio.

Each of the amino acid compounds can be used alone or in combination of two or more compounds, the addition of which being preferably 0.1–10% by weight against air dried weight of material to be treated such as soil, from the viewpoint of treatment cost and decomposition efficiency of dioxins.

Upon addition and mixing of the amino acid compound to the object to be treated, a certain amount of water is preferably supplied thereto in order to enhance the uniform dispersion of the amino acid compounds. Accordingly, the amino acid compound is preferably added in the form of solution in water, although they can be added in solution of any solvents other than water, or they can optionally be added in powder form. When added in powder form, they can assume solution form after they are added to the material to be treated such as soil.

At the addition and mixing of the amino acid compound, an excessive supply of water makes the treated material slurry-like, increasing the water-absorbing agent requirement. The concentration of the aqueous solution of the amino acid compound is preferably controlled in such a manner that the total water content of the object to be treated such as soil after addition of the solution comprises 2–30 parts by weight against 100 parts by weight of air dried soil.

Quicklime, water-absorbing resin, zeolite and other water-absorbing minerals, and silica gel can be used as the water-absorbing agent. Quicklime is especially preferable as it has an effect to produce finer granule, and also it gives higher decomposition ratio.

Any kind of water absorbing-resin, and starch-based or acrylic acid-based products in the market can be used. As to product form of the resin, a fine powder form is preferred to the powder form from the viewpoint of absorption efficiency.

The additive amount of the water-absorbing agent is determined depending on the nature of the object to be treated, that is, its lumping or sticking tendencies, or amount of water supplied at the addition of the amino acid compound. For quicklime, 1–50 weight %, especially 3–20 weight % against air dried weight of the object to be treated such as soil is preferable. For water-absorbing resin, 0.1–5 weight %, especially 0.2–3 weight % against air dried weight of the object to be treated such as soil is preferable. For silica gel or water-absorbing clay minerals such as zeolite, 1–50 weight %, especially 3–20 weight % against air dried weight of the object to be treated such as soil is preferable. In addition, when water-absorbing resin is used as water-absorbing agent, mixing operation should be carried out carefully, because an excessive kneading can cause lumping just as the case in which water-absorbing agent is not used.

The addition of the water-absorbing agent after addition and mixing of the amino acid compound prevents lumping and sticking, and considerably improves the handling property of the object to be treated as a result of water absorption by the water-absorbing agent.

After addition and mixing of the water-absorbing agent, the mixture is heated. The higher the heating temperature, the higher the decomposition rate and, consequently, the decomposition ratio, but generally 200–400° C., especially 250–350° C. is preferable. A reaction temperature lower than 200° C. gives low reaction rate and low decomposition ratio. A reaction temperature higher than 400° C. gives rise to high treatment cost because of increased thermal energy, and also to disadvantages such as vaporization of halogenated organic compounds such as dioxins.

The reaction time varies depending on the reaction temperature, the form of the object to be treated, the dioxins concentration, or other conditions, but typically, it can be appropriately set at a range of 10–180 minutes.

A certain mixing is preferable during heating reaction in order to equalize the temperature in the system, but this is not always necessary.

Heating can be carried out using, for example, a rotary kiln. For instance, the above described mixture is introduced into one end of a rotary kiln and discharged from the other end. During this process, the mixture subjected to the heat treatment keeps a smooth flowing state ensuring a smooth treatment without depositing inside the rotary kiln.

The method according to the third and fourth aspects can be easily carried out with a very simple equipment, as the process consists of only adding and mixing the amino acid compound and, if desired, the water absorbing agent with the object to be treated such as soil, followed by heating.

The fourth aspect will be described more concretely with reference to examples and comparative examples.

In the following examples and comparative examples, dioxins-contaminated soil (particle size under 4.75 mm, water content: 15 weight %, dioxins concentration 12,000 pg-TEoQg) was used as sample for material containing halogenated organic compounds. Water content was determined from the weight loss (weight %) after drying at 105° C. For dioxins concentration, PCDD and PCDF wer e determined in accordance to "The Tentative Manual for Soil Survey Related to Dioxins" (January 1998) by Water Quality Bureau, Environment Agency, Government of Japan.

EXAMPLES 11, 12

The treatment was carried out using the rod-containing, outer rotating vibration mixer shown in FIGS. 1–3 as mixing apparatus.

At first, 5.0 kg of soil sample and a water solution of lysine were fed to the rod-containing, outer rotating vibration mixer and were mixed for 5 minutes. Added amount of lysine was 0.17 kg and added amount of water was 0.51 kg. The total water content was 1.21 kg consisting of 0.75 kg from original water content of soil and 0.51 kg from lysine aqueous solution. This first mixture obtained in the first mixing step was observed for state of mixing of lysine, morphology, and rigidity. The results are shown in Table 3.

Then, quicklime was added to the first mixture in addition amount shown in Table 3 and was mixed for 5 minutes. This second mixtures obtained in the second mixing step were observed for state of mixing of quicklime, morphology and rigidity of the mixed products. The results are shown in Table 3.

Then, the second mixtures were heat-treated in an electric furnace at 300° C. for 60 minutes. Morphology, dioxins concentrations (toxicity equivalent) and decomposition ratios of the obtained treated products are shown in Table 3, showing a satisfactory decomposition level.

COMPARATIVE EXAMPLES 4, 5

The first and the second mixing step and the heat treatment were carried out similarly as in Examples 11 and 12 except that mixers shown in Table 3 were used instead of the rod-containing, outer rotating vibration mixer. The obtained results are shown in Table 3.

TABLE 3

|  |  | Example 11 | Example 12 | Comparative Examples 4 | Comparative Examples 5 |
|---|---|---|---|---|---|
| First mixing step | Mixer type* | Rod-containing outer rotated vibration mixer | Rod-containing outer rotated vibration mixer | Kneader type mixer (45 rpm) | Multi-rod type mixer (75 rpm) |
|  | State of mixing of Lysine | uniform | uniform | somewhat uneven | somewhat uneven |
|  | Morphology of mixture | non-sticking small lump | non-sticking small lump | sticky lump | sticky lump |
|  | Rigidity of mixture | somewhat soft | somewhat soft | soft | soft |
| Second mixing step | Quicklime addition (kg) | 0.75 | 0.50 | 0.75 | 0.75 |
|  | Mixer type* | Rod-containing outer rotated vibration mixer | Rod-containing outer rotated vibration mixer | Kneader type mixer (60 rpm) | Multi-rod type mixer (120 rpm) |
|  | State of mixing of quicklime | good | good | bad at vessel corners | bad at vessel corners, soil deposit on agitator shaft |
|  | Morphology of mixture | fine granule (diameter under 2 mm) | fine granule (diameter under 2 mm) | large, irregular granule | large granule and large lump |
|  | Rigidity of mixture | rigid | rigid (less rigid than example 11) | soft in large lump, rigid in small granule | soft in large lump, rigid in small granule |
| Heating step | Morphology of heated material | fine granule (diameter under 2 mm) | fine granule (diameter under 2 mm) | overall lumping | large granule and large lump |
|  | Rigidity of heated material | rigid but crushable | rigid but crushable | partly easy crushable, partly uncrushable | partly easy crushable, partly uncrushable |
|  | Dioxins concentration (pg-TEQ/g) | 41 | 47 | 820 | 660 |
|  | Dioxins decomp. ratio % | 99.7 | 99.6 | 93.2 | 94.5 |

*Figures in parentheses indicates a number of rotation.

The following is shown clearly from Table 3. In Comparative Examples 4 and 5, soil showed a sticky and lumpy nature after adding and mixing of lysine solution, making an uniform distribution of quicklime difficult in the second mixing step. Especially, in Comparative Examples 4 and 5, soil yielded deposit on the agitation shaft which was difficult to remove. Further, the second mixtures from Comparative Examples 4 and 5 were difficult to feed to the kiln, and the mixtures became lumpy inside the kiln, plugging the kiln and making the treatment impossible. The reason of higher dioxins concentration in Comparative Examples 4 and 5 is thought to be in the uneven distribution of lysine, and low heat transfer (because of voids) in the electric furnace.

On the contrast, in Examples 11 and 12 where the rod-containing, outer rotating vibration mixer was used for mixing, both the first and the second mixtures were mixed uniformly, having excellent handling properties which enabled a smooth treatment in the rotary kiln. In addition, their high heat efficiency in the heating treatment gave a satisfactory decomposition of dioxins.

As described in detail in the above, according to the third and fourth aspects of the method for decomposing halogenated organic compounds, (1) In the first mixing step, decomposing agent can be uniformly distributed with small amount of water without formation of sticky lump (dumpling-like) of the solid material to be treated such as soil. The mixing of subsequently added water-absorbing agent is also easy, giving a mixture with excellent handling property while decreasing the requirement of the water-absorbing agent.

(2) Especially, according to a method in which the first and the second mixing steps are carried out in a mixer as shown in FIGS. 1–3, the second mixing step in which water absorbing agent is mixed with the first mixture can be carried out in a short time (instantly), giving a fine granuled mixture with excellent handling property, while decreasing the requirement of the water-absorbing agent.

(3) The mixture obtained through the mixing steps (1), (2) has excellent handling property, is easy to feed constantly to heating apparatus such as kiln, has good flowing property in kiln, and has good thermal transmission, thus in overall giving rise to an efficient decomposition of halogenated organic compounds. In addition, it has no tendency of lumping and plugging in kiln, being easily discharged out of kiln.

These effects are advantageous in the industrial decomposition treatment of halogenated organic compounds.

In the present invention, halogenated organic compounds which can be the object of decomposition include, beside previously mentioned dioxins such as PCDD, PCDF and PCB and dioxins-containing materials, such environmental hormones as pentachrolophenol, 2,4-dichlorophenoxiacetic acid, and 2,4-dichlorophenol.

Further, materials to be treated containing halogenated organic compounds are by no means limited to soil, but include such materials as active carbon, incineration ash, incineration flyash, lake and river dredging, harbor dredging, residual soil from construction, bricks, concrete, sludge, and wood. Especially, the methods according to the second, third and fourth aspects exhibit remarkable effects in the treatment of such materials as soil, lake and river dredging, harbor dredging, residual soil from construction, and sludge, which have tendency to form lump or dumpling in thie kneading process.

What is claimed is:

1. A method for decomposition of a halogenated organic compound comprising a step in which the halogenated organic compound is brought into reaction under heating with at least one amino acid compound selected from a group consisting of amino acids, polyamino acids, amino acid salts, and polyamino acid salts.

2. A method for decomposition of halogenated organic compound according to claim 1, wherein said halogenated organic compound is at least one of dioxins and dioxins-containing material.

3. A method for decomposition of halogenated organic compound according to claim 1, wherein an additive amount of the amino acid compound is 0.1–10 weight % against air dried weight of an object to be treated.

4. A method for decomposition of a halogenated organic compound according to claim 1, wherein the heating temperature is 200–400° C.

5. A method for decomposition of a halogenated organic compound according to claim 1, wherein the heating temperature is 250–350° C.

6. A method for decomposition of a halogenated organic compound comprising steps of:

adding and mixing at least one amino acid compound selected from a group consisting of amino acids, polyamino acids, amino acid salts, and polyamino acid salts with material containing a halogenated organic compound;

subsequently adding and mixing a water-absorbing agent; and subsequently heating the mixed material.

7. A method for decomposition of a halogenated organic compound according to claim 6, wherein the material containing halogenated organic compound is soil.

8. A method for decomposition of a halogenated organic compound according to claim 6, wherein the water-absorbing agent is quicklime.

9. A method for decomposition of a halogenated organic compound according to claim 6, wherein the halogenated organic compound is dioxins.

10. A method for decomposition of a halogenated organic compound according to claim 6, wherein the additive amount of the amino acid compound is 0.1–10 weight % against air dried weight of object to be treated.

11. A method for decomposition of a halogenated organic compound according to claim 6, wherein the water-absorbing agent is quicklime of which additive amount is 1–50 weight % against air dried weight of object to be treated.

12. A method for decomposition of a halogenated organic compound according to claim 6, wherein the water-absorbing agent is water-absorbing resin, of which additive amount is 0.1–5 weight % against air dried weight of object to be treated.

13. A method for decomposition of a halogenated organic compound according to claim 6, wherein the heating temperature is 200–400° C.

14. A method for decomposition of a halogenated organic compound according to claim 13, wherein the heating temperature is 250–350° C.

15. A method for decomposition of a halogenated organic compound comprising steps of:

adding and mixing at least one amino acid compound selected from a group consisting of amino acids, polyamino acids, amino acid salts, and polyamino acid salts with material containing a halogenated organic compound; and subsequently heating the mixed material, said mixing step employing a mixer having a drum which contains mixing media in the drum which rotates around a horizontal axis while simultaneously vibrating, whereby an uniform mixing is achieved by mutual collision of said solid material and said mixing media.

16. A method for decomposition of a halogenated organic compound comprising;

a first mixing step in which at least one amino acid compound selected from a group consisting of amino acids, polyamino acids, amino acid salts, and polyamino acid salts is added and mixed with solid material contaminated with the halogenated organic compound;

a second mixing step in which a water-absorbing agent is added and mixed with the mixture from said first mixing step; and a heating step in which the mixture from said second mixing step is heated to decompose the halogenated organic compound, said first mixing step employing a mixer having a drum which contains mixing media in the drum which rotates around a horizontal axis while simultaneously vibrating, whereby an uniform mixing is achieved by mutual collision of said solid material and said mixing media.

17. A method for decomposition of a halogenated organic compound according to claim 16, wherein said drum rotates around a horizontal axis while simultaneously vibrating, whreby an uniform mixing is achieved by mutual collision of said solid material and said mixing media.

18. A method for decomposition of a halogenated organic compound according to claim 15, wherein the solid material contaminated with halogenated organic compounds is soil.

19. A method for decomposition of a halogenated organic compound according to claim 15, wherein the water-absorbing agent is quicklime.

20. A method for decomposition of a halogenated organic compound according to claim 15, wherein the halogenated organic compound is dioxins.

21. A method for decomposition of a halogenated organic compound according to claim 15, wherein the heating temperature is 200–400° C.

22. A method for decomposition of a halogenated organic compound according to claim 15, wherein the heating temperature is 250–350° C.

* * * * *